US010929708B2

(12) United States Patent
Syeda-Mahmood et al.

(10) Patent No.: US 10,929,708 B2
(45) Date of Patent: Feb. 23, 2021

(54) DEEP LEARNING NETWORK FOR SALIENT REGION IDENTIFICATION IN IMAGES

(71) Applicant: International Business Machines Corporation, Armonk, NY (US)

(72) Inventors: Tanveer F. Syeda-Mahmood, Cupertino, CA (US); Alexandras Karargyris, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 16/214,922

(22) Filed: Dec. 10, 2018

(65) Prior Publication Data

US 2020/0184252 A1    Jun. 11, 2020

(51) Int. Cl.
G06K 9/46 (2006.01)
G06N 3/08 (2006.01)
G06T 11/00 (2006.01)

(52) U.S. Cl.
CPC ......... *G06K 9/4676* (2013.01); *G06K 9/4609* (2013.01); *G06N 3/08* (2013.01); *G06T 11/003* (2013.01)

(58) Field of Classification Search
None
See application file for complete search history.

(56) References Cited

U.S. PATENT DOCUMENTS

| 8,014,576 | B2 | 9/2011 | Collins et al. |
| 8,369,593 | B2 | 2/2013 | Peng et al. |
| 8,391,574 | B2 | 3/2013 | Collins et al. |
| 9,668,699 | B2 | 6/2017 | Georgescu et al. |
| 10,127,659 | B2 | 11/2018 | Hsieh et al. |
| 10,140,544 | B1 | 11/2018 | Zhao et al. |
| 10,169,863 | B2 | 1/2019 | Reicher et al. |
| 10,210,613 | B2 | 2/2019 | Xu et al. |
| 10,229,517 | B2 | 3/2019 | Raupach et al. |

(Continued)

OTHER PUBLICATIONS

Bhadauria, H. et al., "Intracranial hemorrhage detection using spatial fuzzy c-mean and region-based active contour on brain CT imaging", Signal, Image and Video Processing 8(2), Feb. 2014, Abstract, 1 page.

(Continued)

*Primary Examiner* — Leon Flores
(74) *Attorney, Agent, or Firm* — Stephen J. Walder, Jr.; William J. Stock

(57) ABSTRACT

Mechanisms are provided to implement a hybrid deep learning network. The hybrid deep learning network receives, from a imaging system, first input data specifying a non-annotated image. The hybrid deep learning network pre-processes the non-annotated image to generate second input data specifying a hint image and corresponding annotation data specifying salient regions of the hint image. The hybrid deep learning network processes the first input data and second input data to perform training of the hybrid deep learning network by targeting feature detection in the non-annotated image in the salient regions identified in the hint image. The trained hybrid deep learning network is used to process third input data specifying a new non-annotated image to thereby identify an object or structure in the new non-annotated image.

18 Claims, 8 Drawing Sheets

(4 of 8 Drawing Sheet(s) Filed in Color)

(56) References Cited

U.S. PATENT DOCUMENTS

| | | | |
|---|---|---|---|
| 10,235,606 | B2 | 3/2019 | Miao et al. |
| 10,242,443 | B2 | 3/2019 | Hsieh et al. |
| 10,269,114 | B2 | 4/2019 | Reicher et al. |
| 10,276,265 | B2 | 4/2019 | Reicher et al. |
| 10,347,010 | B2 | 7/2019 | Risman et al. |
| 2016/0358035 | A1* | 12/2016 | Ruan .................. G06K 9/4676 |
| 2019/0223725 | A1 | 7/2019 | Lu et al. |
| 2019/0251694 | A1 | 8/2019 | Han et al. |
| 2019/0272634 | A1 | 9/2019 | Li et al. |
| 2019/0294970 | A1 | 9/2019 | Fidler et al. |
| 2019/0304092 | A1 | 10/2019 | Akselrod-Ballin et al. |
| 2019/0336109 | A1 | 11/2019 | Pheiffer et al. |
| 2019/0340763 | A1 | 11/2019 | Laserson |
| 2019/0354882 | A1 | 11/2019 | Sharma et al. |
| 2019/0385018 | A1 | 12/2019 | Ngo Dinh et al. |
| 2020/0020098 | A1* | 1/2020 | Odry .................. G06K 9/6244 |

OTHER PUBLICATIONS

De Brebisson, Alexandre D. et al., "Deep Neural Networks for Anatomical Brain Segmentation", Proceedings of the IEEE Conference on Computer Vision and Pattern Recognition Workshops, submitted version arXiv:1502.02445v2 [cs.CV], Jun. 25, 2015, 9 pages.

Gong, Tianxia et al., "Classification of CT Brain Images of Head Trauma", IAPR International Workshop on Pattern Recognition in Bioinformatics, Oct. 1-2, 2007, 8 pages.

Gong, Tianxia et al., "Finding Distinctive Shape Features for Automatic Hematoma Classification in Head CT Images from Traumatic Brain Injuries", 2013 IEEE 25th International Conference on Tools with Artificial Intelligence, Nov. 2013, 8 pages.

Liao, Chun-Chih et al., "A Knowledge Discovery Approach to Diagnosing Intracranial Hematomas on Brain CT: Recognition, Measurement and Classification", International Conference on Medical Biometrics, Jan. 2008, 10 pages.

Liao, Chun-Chih et al., "A multiresolution binary level set method and its application to intracranial hematoma segmentation", Computerized Medical Imaging and Graphics 33(6), Apr. 2009, 8 pages.

Park, Eunbyung et al., "Combining Multiple Sources of Knowledge in Deep CNNs for Action Recognition", 2016 IEEE Winter Conference on Applications of Computer Vision (WACV), Mar. 7-10, 2016, 8 pages.

Shahangian, Bahare et al., "Automatic brain hemorrhage segmentation and classification in CT scan images", 2013 8th Iranian Conference on Machine Vision and Image Processing (MVIP), Sep. 10-12, 2013, Abstract, 3 pages.

Sharma, Bhavna et al., "Automatic Segmentation of Brain CT Scan Image to Identify Hemorrhages", International Journal of Computer Applications (0975-8887), vol. 40, No. 10, Feb. 2012, 4 pages.

High, Rob, "The Era of Cognitive Systems: An Inside Look at IBM Watson and How it Works", IBM Corporation, Redbooks, Dec. 12, 2012, 16 pages.

Mahmood, R. et al., "Automatic Detection of Left Ventricular Aneurysms in Echocardiograms", IEEE International Symposium on Biomedical Imaging (ISBI), Apr. 16-19, 2015, 4 pages.

Ronneberger, Olaf et al., "U-Net: Convolutional Networks for Biomedical Image Segmentation", International Conference on Medical Image Computing and Computer-Assisted Intervention, Springer (2015), arXiv:1505.04597v1 [cs.Cv], May 18, 2015, 8 pages.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

\* cited by examiner

DEEP LEARNING NETWORK FOR SALIENT REGION IDENTIFICATION IN IMAGES

BACKGROUND

The present application relates generally to an improved data processing apparatus and method and more specifically to mechanisms for providing a deep learning network for salient region identification in images.

Deep learning networks, or deep neural networks (DNNs), are a type of artificial neural network with multiple hidden layers between the input and the output layers. DNNs can model complex non-linear relationships and generate compositional models where the object is expressed as a layered composition of primitives. The extra layers enable composition of features from lower layers, potentially modeling complex data with fewer units than a similarly performing shallow network. DNNs are typically feedforward networks in which data flows from the input layer to the output layer without looping back. Convolutional deep neural networks (CNNs) are often used in computer vision.

Deep learning networks, DNNs, and CNNs are gaining popularity in many medical image analysis tasks due to their generalized ability to automatically extract relevant features from raw images. However, this can make the learning problem unnecessarily harder requiring network architectures of high complexity.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, wherein the at least one memory comprises instructions that are executed by the at least one processor to cause the at least one processor to implement a hybrid deep learning network. The method comprises receiving, by the hybrid deep learning network, from a imaging system, first input data specifying a non-annotated image. The method further comprises pre-processing, by the hybrid deep learning network, the non-annotated image to generate second input data specifying a hint image and corresponding annotation data specifying salient regions of the hint image. Moreover, the method comprises processing, by the hybrid deep learning network, the first input data and second input data to perform training of the hybrid deep learning network by targeting feature detection in the non-annotated image in the salient regions identified in the hint image. In addition, the method comprises processing, using the trained hybrid deep learning network, third input data specifying a new non-annotated image to thereby identify an object or structure in the new non-annotated image.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Deep Learning has become the primary methodology for training a cognitive computing system on large datasets. For example, deep learning may be used to assist with cognitive computing operations performed on medical images which help medical professionals identify medical conditions in such medical images that may require further attention by the medical professional, e.g., performing various tasks including anatomical structure classification, segmentation, and anomaly detection.

In a medical imaging deep learning network, raw medical image data may be fed to the deep learning network, which may comprise a convolutional neural network (CNN), for example, and a set of convolutional layers that filter the data. Unlike conventional filters in which the filter coefficients are determined from a formula such as for an adaptive filter, a Butterworth filter, etc., in deep learning the filter coefficients are determined through a machine learning training process that is ultimately tied to the selected objective function of the deep learning network, e.g., CNN, used for label classification. The different combinations of weights on the filter evaluated during optimization are effectively equivalent to looking for features in all possible orientations, in all possible intensity ranges, etc. and determining whether any of them are persistently observed for a class. Thus, the feature relevancy is inferred by tying the medical image data to an objective function driven by the particular task being performed, e.g., classification, anomaly detection, segmentation, etc. The deep learning network, given sufficient depth in layers and a sufficiently large training data set, eventually converges to learning the way in which to achieve the task through a machine learning approach that may involve modifying weights associated with nodes in the convolutional layers and/or other performance parameters. Thus, a key advantage of a deep learning network of the illustrative embodiments is its ability to self-learn complex feature sets from raw images (non-annotated images) in contrast to traditional hand-crafted features that require expert knowledge and have limited generalization. However, this process is complex and convergence is not always guaranteed. Further, to achieve generalization, the deep learning network needs to use a large number of layers with often long convergence times and possible overfitting. For domain-specific tasks, such as anomaly detection in medical imaging, it has been recognized herein that additional information is available from the modality and anatomical regions being imaged which can be used to develop simpler representations for highlighting anomalies. For example, in computed tomography (CT) studies, Hounsfield units and their value ranges for different tissues can be exploited to segment different tissue structures.

Figure 1A:
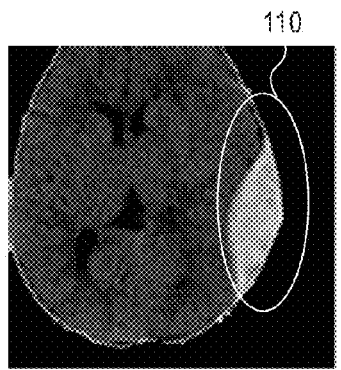
FIG. 1A shows an example computed tomography (CT) image depicting epidural hematoma in the brain.
Figure 1B:
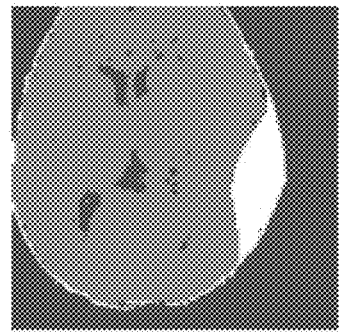
FIG. 1B shows anomaly region highlighting in the image of FIG. 1A using a 3-level partitioning of intensities.
Figure 1C:
FIGS. 1C and 1D show images with similar intensity and contrast.
Figure 1D:

FIG. 1A, for example, shows an example CT image depicting epidural hematoma in the brain. Using a 3-level partitioning of intensities, the anomaly region 110 can be easily highlighted as shown in FIG. 1B. However, such pure bottom-up processing, i.e. looking at the individual base elements first and then devising a perception from the linkage of the individual base elements to form a more complete understanding, alone is not sufficient to segment the anomaly, since often such anomalous regions either extend into surrounding regions or there are other regions in the image with similar intensity and contrast, as shown in FIGS. 1C and 1D. Hence, some form of supervision is helpful in deep learning-based segmentation to accurately delineate the anomalous region.

The mechanisms of the illustrative embodiments are based on the recognition that, in domains where there are clearly well-known patterns that are more easily seen in the data through bottom-up analysis, or where "clinically meaningful" features are easy to define, the speed of the machine learning process may be increased by not relying on the raw image input alone. In cases where there is sufficient knowledge to inform the deep learning network what is important, the deep learning network may be given hints that reduce the work of the deep learning model without biasing it. That is, the illustrative embodiments advance the idea that saliency-driven pre-segmentation based on saliency operators that highlight certain intensity regions in the medical image, and which may be easily obtained in an unsupervised manner, may be used to improve the results of a deep, fully convolutional neural network. Specifically, a hybrid deep learning network is provided based on a fully convolutional neural network architecture that uses the pre-processing from a saliency-based segmentation to focus the learning process on regions of interest, e.g., regions where anomalies are likely present in an anomaly detection and delineation task.

The illustrative embodiments implement salient area identification logic that highlights where the salient areas or regions in medical images are, for the particular type of medical image, e.g., anatomical region, medical imaging technology used, mode, modality, and the task being performed, e.g., identifying particular types of anomalies or the like. The salient area identification logic provides this information as an additional input, as "hint" medical image data, along with the raw medical image data that is to be processed by the deep learning neural network, e.g., a fully convolutional network, such as a U-Net, FCNN, or the like. This is particularly suitable for anomaly segmentation which is usually limited to a small region in the image. During a training operation for training the deep learning network, the raw medical image data is augmented with the hint medical image data, which is provided to improve the speed and performance of the training. The hint medical image data provides coarse grain identification of salient areas of the medical image in which the deep learning network should focus its feature extraction or identification, i.e. the hint medical image data (also referred to as the "hint image") is used to target medical image areas where more targeted analysis is performed to identify features indicative of particular anatomical structures, anomalies, and the like, depending on the particular task being performed.

With the mechanisms of the illustrative embodiments, it is possible for a deep learning network to learn faster, implementing a simpler deep learning network architecture, e.g., a relatively smaller number of convolutional layers than would be needed to discern salient features in a deep learning network that did not employ the mechanisms of the illustrative embodiments. The benefits of faster learning and reduced complexity of the deep learning network are achieved by augmenting the deep learning network and its machine learning process to process, in addition to raw image (non-annotated image) data, also referred to herein as simply the "raw image", a pre-processed input, such as a hint image with annotations specifying salient areas, which is generated from a bottom-up analysis of the raw image. The labels for training the deep learning network are actual anomaly regions segmented by a subject matter expert (SME). The hint image supplied as input is expected to highlight the anomaly region in its selected region although it is not required that only the anomaly region be selected, as the remaining false positive regions can be filtered out during the deep learning training process. That is, if the anatomical structure, anomaly, or the like, can be guaranteed to be within the salient region(s) identified by the hint image, then the supervised deep learning network training can be used to prune irrelevant regions of training image data much faster using a simpler network to recognize and localize the anatomical structures, anomalies, etc. Thus, while existing deep learning networks train based on the supplied raw image data and labels, a novel aspect of this invention is how to incorporate top-down knowledge of characteristics of the anomaly incorporated into the deep learning process.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides mechanisms for an improved deep learning network, such as a deep neural network (DNN), that takes the combined input of a raw image, such as a training image, and the saliency region annotated image, i.e. the saliency region image or "hint" image, as input. This improved deep learning network is also referred to herein as a hybrid deep learning network, as the improved deep learning network combines a fully convolutional neural network architecture with pre-processed saliency-based segmented saliency region images or hint images that focus the learning of the fully convolutional neural network.

The saliency region images or "hint" images may be generated through many methods including multi-level thresholding followed by region grouping with different saliency operators. The saliency operators, such as region size, location, color, intensity, or any other image characteristic that is indicative of salient portions of a medical image, should be conservatively tuned to not miss the region of interest to the particular task being performed by the deep learning network, e.g., anatomical structure identification, anomaly detection, etc. For purposes of the following description, it will be assumed that the task is to perform anomaly detection in medical images, i.e., identify anatomical structures within a medical image that are indicative of an anomaly, e.g., a mass or other difference in anatomical structure from that of a healthy individual. It should be appreciated that this is only one type of task for which the mechanisms of the illustrative embodiments may be utilized and any other task that is accomplished through analysis of images may be implemented using the mechanisms described herein without departing from the spirit and scope of the present invention.

The mechanisms of the illustrative embodiments collect image data, which may be two-dimensional (2D) or three-dimensional (3D) for an anomaly detection task. This image data may be obtained from imaging systems, such as a medical imaging system employing a particular medical imaging technology, such as x-ray technology, sonogram technology, computed tomography (CT) scan technology, positron emission tomography (PET) scan technology, magnetic resonance imaging (MRI) technology, echocardiography imaging, etc. An unsupervised learning operation is performed that annotates the collected image data a priori to generate annotated image data, where the annotations identify anatomical structures present in the medical image, e.g., contours with appropriate labels, identifying the anatomical structures present, and thereby identifying a hint image corresponding to the collected image data. This hint image is generated entirely in an unsupervised manner using one or more saliency operators that naturally highlight regions that stand out in the raw collected image data. It is assumed in this formulation that the anomalous regions are among the salient regions identified by application of the one or more saliency operators. All that is needed in the hint image is that the anomalous region be among the salient regions.

Thus, the raw (non-annotated) collected image data is pre-processed using one or more saliency operators to thereby segment the raw collected image data into one or more salient regions. Since the goal is to prime the learning process of the hybrid deep learning neural network in a generalizable manner, the segmentation processes are chosen to complement the self-learning features of the network in the hybrid deep learning neural network in a generalizable manner, i.e. not tailor-made for a specific anomaly or anatomical structure. As a result, the saliency operator, i.e. the image characteristics used to identify regions of interest (salient regions) within a medical image, are generalized. In one illustrative embodiment, the saliency operator is a region size filter on regions of different tissue densities. In medical imaging, there are a few major tissues of interest, such as blood, parenchyma, fat, air, and bone, which are characterized by different Hounsfield unit ranges.

Since different imaging devices may offer different ranges, the intensity levels for various tissue structures may be estimated using information in the medical image alone using an algorithm such as multi-level thresholding algorithm, e.g., a multi-level Otsu threshold, as described in R. Mahmood et al., "Automatic Detection of Left Ventricular Aneurysms in Echocardiograms," 2013 IEEE ISBI Conference, 242-249, IEEE (2015). Using a multi-level thresholding approach, the intensity histogram of the medical image is segmented into levels optimally chosen based on the distribution of intensities in the medical image, e.g., a CT image. For example, the image intensities may be segmented into N optimal levels $\{t_1^*, t_2^*, \ldots t_N^*\}$ giving N+1 classes: $C_1$ for $[1, \ldots, t_1]$, $C_2$ for $[t_{1+1}, \ldots, t_2]$, $\ldots$, $C_{N+1}$ for $[t_{N+1}, \ldots, L]$ where L is the maximum intensity level observed. The optimal thresholds $\{t_1^*, t_2^*, \ldots t_N^*\}$ are chosen by maximizing the inter-class variance $\sigma_B^2$ $$\{t_1^*, t_2^*, \ldots t_N^*\} = \mathrm{argmax}\{\sigma_B^N(t_1, t_2, \ldots t_N)\} \quad \text{(Eq. 1)}$$

where $\sigma_B^N = \Sigma_{k=1}^N \omega_k (\mu_k - \mu_T)^2$ and $\omega_k = \Sigma_{i \in C_k} p_i$ and $$\mu_k = \sum_{i \in C_k} \frac{i \cdot p_i}{\omega_k},$$

and where $p_i$ is the probability of the gray level i in the image, $\mu_k$ is the class weighted mean, and $\mu_T$ is the overall mean.

As part of this pre-processing, in addition to a multi-level thresholding of the image, color connected component grouping may be used to provide indications of regions of interest. With color connected component grouping, when using certain medical imaging technology, structures having similar characteristics, e.g., density of tissue and the like, show up in the image with a similar coloring or gray-scale, intensity, and the like. Hence, the system looks for portions of the image that have similar coloring, intensities, or the like, and groups them together to represent similar structures. The result of this pre-processing using multi-level thresholding and color connected component grouping is a set of regions of interest for further filtering.

Figures 1E, 1F, 1G, 1H:
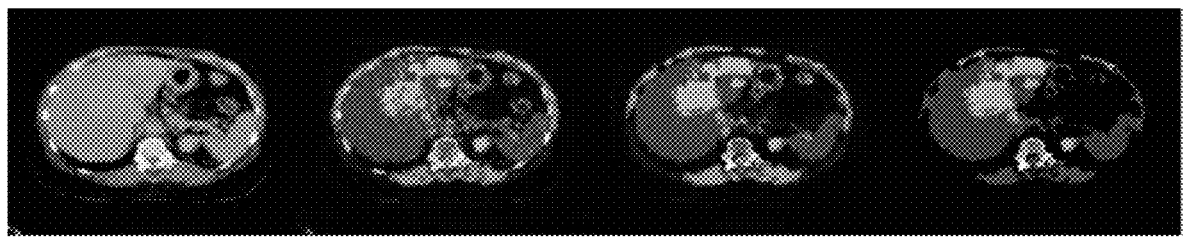
FIGS. 1E and 1F illustrate a raw image (FIG. 1E) and a corresponding noisy image generated using multi-thresholding levels.
FIG. 1G shows a saliency region map with anomaly regions highlighted as may be generated by applying filtering and region smoothing.
FIG. 1H shows a gray level rendering of the saliency region map shown in FIG. 1G.

That is, pure segmentation using the above multi-thresholding levels may yield noisy images, such as the noisy image shown in FIG. 1F for the raw image shown in FIG. 1E. Using knowledge of anomaly sizes relative to the image, smaller regions may be filtered and the resulting regions smoothed to yield a saliency region map with the anomaly regions highlighted, such as shown in FIG. 1G. Since the deep learning network may operate on gray-level input, the choice of N+1 colors for the various tissues structures can be chosen to have sufficient color separation to preserve their distinct gray level renderings as shown in FIG. 1H. This results in the highlighting of the anomaly and suppression of the details in the other regions which provides the regions of interest for further filtering.

The regions of interest are filtered using task specific saliency measures indicating either positive or negative saliency to the particular task. These task specific saliency measures may specify a variety of different characteristics of regions of interest that are to be maintained in the saliency or "hint" images, to assist with the training of the deep learning network, e.g., the DNN or CNN. For example, the saliency measures may include particular size characteristics for the regions of interest, colors, intensities, etc. For example, for calcium scoring, the system may look for small blob-like regions in the image while for hemangiomas the system may prefer larger blob-like regions. Those regions meeting the saliency measures are maintained in the saliency image while those that do not are eliminated or discarded from further use as part of the saliency image. Hence, the saliency, or "hint", image contains only those regions of interest that are identified through the pre-processing and which meet the criteria of the saliency measures. The result is a region saliency image which may be provided as an additional input to the hybrid deep learning neural network to improve the training of the deep learning neural network and reduce the complexity of the deep learning neural network architecture by reducing the required number of convolutional layers needed.

Having generated one or more saliency images or "hint" images to assist with the training of the hybrid deep learning network, during training of the hybrid deep learning network, the raw image and region saliency image, or "hint" image, are fed into the deep learning network. There are multiple ways in which the joint input of the raw image and the region saliency (or "hint") image can be supplied to the deep learning network. In one illustrative embodiment, referred to as an "outer fusion" embodiment, raw image data is externally merged with the hint image data to form a combined image input, with a single set of convolutional filter layers of the deep learning network being used. In another illustrative embodiment, referred to as an "inner fusion" embodiment, two sets of convolutional layers are used, one for each image type (raw image and hint image), and the resulting features produced from both layers are then merged to form the combined feature input to the de-convolution/classifier portion of the deep learning network.

Thus, in one illustrative embodiment, the raw image and hint image data may be combined into a single input and fed into the deep learning network, which is referred to herein as an "outer fusion" embodiment. As another example, in another illustrative embodiment, the raw image and "hint" image may be fed into parallel paths of the deep learning network with the outputs of the deep learning network being merged, which is referred to herein as the "inner fusion" embodiment. In still another illustrative embodiment, rather than feeding both the raw image and the "hint" image into the deep learning network, the "hint" image may be substituted for the raw image and used as a basis for training the deep learning network (this embodiment is referred to herein as the "substitution" embodiment). The substitution embodiment differs from previous mechanisms in that, rather than performing training based on the raw image input, the training is performed based on the hint image data which comprises regional segmented images alone. Unlike the raw image data, which typically is a grey intensity image or varying gray intensities, the hint image data, being a regional image, has more uniform colors for each of the regions including the salient regions identified.

The substitution embodiment works well where anomalous regions are distinctive enough and well separated from other regions in intensity and location. Since the intensity within a region in the region saliency image, or "hint" image, is uniform due to the chosen saliency operators, e.g., chosen color or intensity for the segmentation, it is expected that the deep learning network will saturate in higher layers due to overfitting. In the outer fusion embodiment, combining the two inputs into a single image vector before convolution continues to highlight the anomalous regions without being limited by the uniform intensity saturation problem. With the inner fusion embodiment, which incorporates independent parallel processing of the raw image and the "hint" image, this embodiment performs better as a function of the number of layers in the deep learning network, i.e. the greater the number of convolutional layers in the deep learning network, the better the performance of the training of the deep learning network when implementing the inner fusion embodiment.

Regardless of the particular embodiment utilized, the resulting features generated by the hybrid deep learning network are concatenated and the training of the hybrid deep learning network is enforced through the objective function of the deep learning network. That is, the training process, for example, may modify operational parameters of the convolutional layers of the deep learning network so as to minimize a loss function of the deep learning network, or alternatively maximize the objective function, such as via a stochastic gradient descent training operation or the like.

The deep learning network is trained on the labeled datasets to highlight the anomaly of interest in an anomaly identification task. As noted above, anomaly detection in medical images is only one possible task to which the hybrid deep learning network of the illustrative embodiments may be applied and any other image based processing, classification, or other deep learning processing by a deep learning network may be utilized with the illustrative embodiments, anomaly detection in medical images being selected as only an example herein. Other examples of tasks that may be accomplished using the mechanisms of one or more of the illustrative embodiments may include generalized target object detection in scene images, target object detection in surveillance images, machine part identification, etc. In other words, any application in which objects are to be identified in a "standing out" manner with regard to one or more image attributes, may be improved by the utilization of the mechanisms of the illustrative embodiments.

The resulting trained deep learning network may be deployed for processing other raw images and providing correct outputs to the particular task to which it is applied. Thus, the illustrative embodiments provide mechanisms for improving the training of deep learning neural networks operating on image data by providing a hybrid deep learning network mechanism that operates on raw image data and a "hint" image or region saliency image which has been pre-processed to identify the regions where the particular objects or structures of interest in the image are likely to exist in raw images. This allows the deep learning network to focus on these regions for feature extraction and processing when performing training of the deep learning network. As a result, the training of the deep learning network is made to happen more quickly and the complexity of the deep learning network architecture is made simpler by requiring a smaller number of convolutional layers.

While the hybrid deep learning network mechanisms of the illustrative embodiments may be applied to any deep learning network, in some illustrative embodiments, an augmentation of a U-Net deep learning network, such as described in Ronneberger et al., "U-Net: Convolutional Networks for Biomedical Image Segmentation," International Conference on Medical Image Computing and Computer-Assisted Intervention, 234-241, Springer (2015), is implemented. For these embodiments, the U-Net architecture was selected as a basis for the hybrid deep learning network due to its suitability to the task of binary segmentation of an anomaly using an expansive path for localization, its ability to work with small training datasets, and its accurate handling of objects of a same tissue class.

Figure 2:
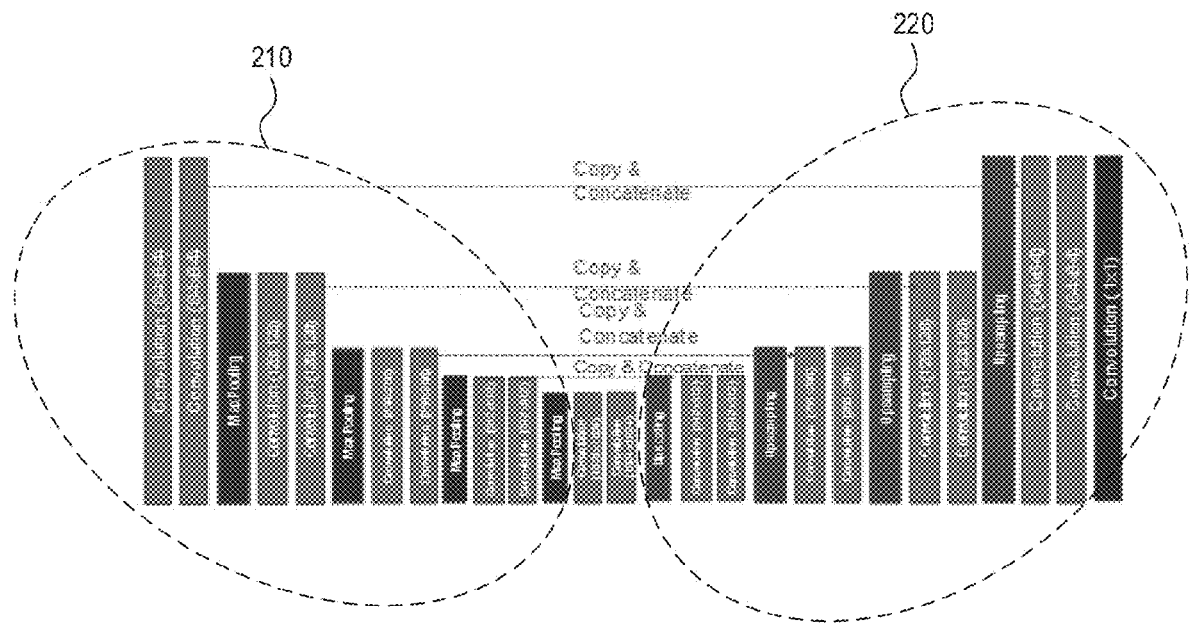
FIG. 2 is an example diagram illustrating an original U-Net architecture.

FIG. 2 is an example diagram illustrating the original U-Net architecture, such as described in Ronneberger et al. cited above. As shown in FIG. 2, the U-Net architecture consists of a contracting path 210 (left side of the diagram) and an expansive path 220 (right side of the diagram). The contracting path 210 consists of 3×3 convolutions followed by non-linear activation functions through a rectified linear unit (ReLU) in each layer. Propagation from one layer to the next is through a 2×2 maxpooling operation, i.e. taking the output from clusters of nodes of the convolution layer and outputting the maximum value from the cluster. The sequence of convolutions and maxpooling operations results in a contraction operation designed to capture the existence of an anomaly. Since the task is anomaly segmentation, an expansion path 220 is pursued in which a high-resolution segmentation map is created from a sequence of up-convolutions and concatenations with the original features. This up-convolution uses a learned filter or kernel to map each feature vector into a 2×2 output window again followed by a non-linear activation function. The output segmentation map has 2 channels, one for the foreground and one for the background resulting in anomaly segmentation and localization in the resulting binary map. In total, the U-Net has 23 layers, 18 of which are convolutional layers.

This base U-Net architecture may be modified or augmented according to one or more of the illustrative embodiments to provide a hybrid deep learning network in which both raw image data and a "hint" image or region saliency image are provided as input and processed via the modified or augmented U-Net architecture to generate an output, such as an indication of the presence/non-presence of anomalies in the raw image data. Moreover, in one illustrative embodiment, rather than processing the raw image data, the "hint" image is substituted for the raw image data and used to train the hybrid deep learning network, i.e. the hybrid U-Net.

Figure 3A:
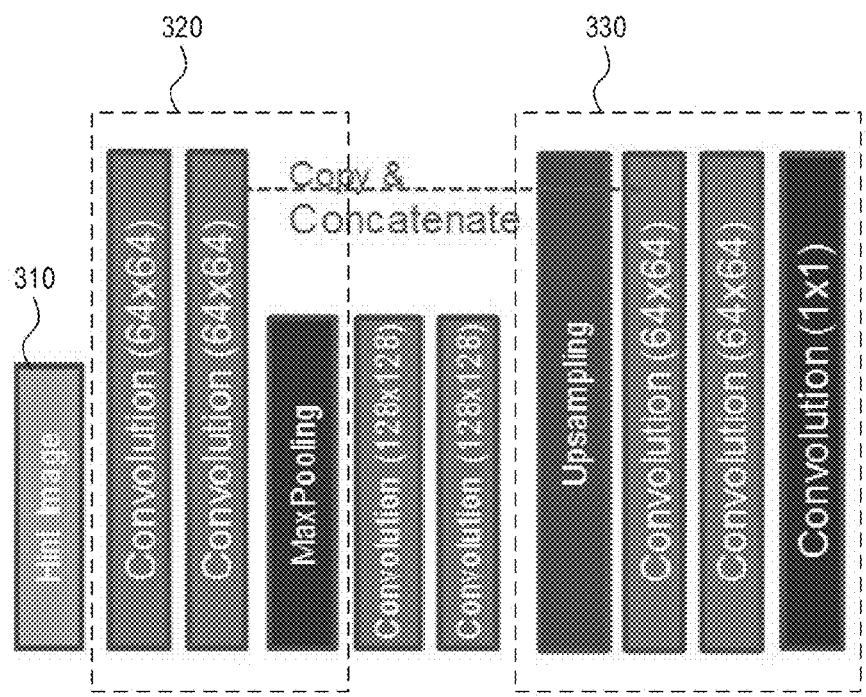
FIG. 3A is an example diagram illustrating one illustrative embodiment of a hybrid deep learning network in accordance with one illustrative embodiment, in which the hint image has been substituted for the raw image data during training of the deep learning network, which in this case is modeled as a U-Net architecture.

FIG. 3A is an example diagram illustrating one illustrative embodiment of a hybrid deep learning network in accordance with one illustrative embodiment, in which the hint image has been substituted for the raw image data during training of the deep learning network, which in this case is modeled as a U-Net architecture. In the depicted example, the hybrid deep learning network shown in FIG. 3A is shown as being based on a 6-layer version of the U-Net architecture due to the illustrative embodiment's ability to achieve convergence and learning with fewer layers. Thus the deep learning network's complexity, i.e. the number of parameters to tune, is smaller and the model generated is of smaller size making it easy to store and deploy in small-scale computing infrastructures, such as mobile devices. The salient region image, or hint image 310, is a regional segmented image with segmented regions artificially encoded in color choices designed to separately display the regions. The original non-annotated image is a gray-scale image for medical images (i.e. no color). The regional segmented image, being uniform colored within a region, makes the anomaly region stand out or be salient. As shown in FIG. 3A, the hint image 310 is input to the contracting path 320 of the U-Net architecture and processed via the convolutional layers, maxpooling layer, and the expansion path 330 to generate a segmentation map output.

Figure 3B:
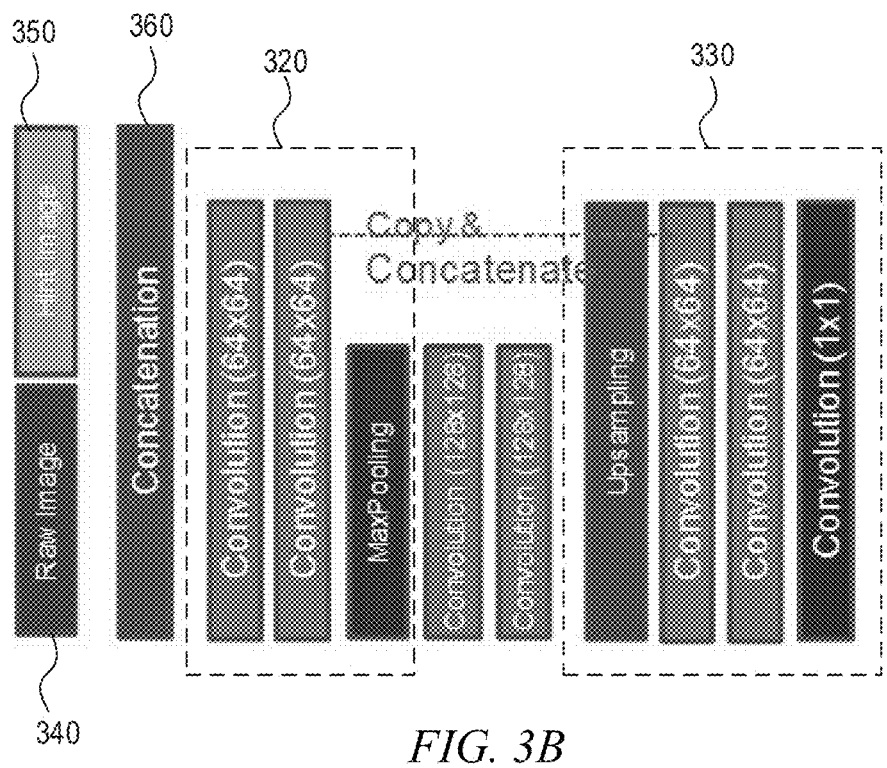
FIG. 3B is an example diagram illustrating one illustrative embodiment of a hybrid deep learning network in accordance with one illustrative embodiment, in which the hint image is concatenated with the raw image data prior to the convolutional layers of the deep learning network operating on the image data.

FIG. 3B is an example diagram illustrating one illustrative embodiment of a hybrid deep learning network in accordance with one illustrative embodiment, in which the hint image is concatenated with the raw image data prior to the convolutional layers of the deep learning network operating on the image data, i.e. an outer fusion operation. Again, the base architecture of the deep learning network is modeled after the U-Net architecture in this example illustrative embodiment. However, as shown in FIG. 3B, both the raw image data 340 and the hint image data 350 are input to a concatenation layer 360 which concatenates the vector inputs of the raw image data 340 and hint image data 350 to generate a single input vector to the convolutional layers of the contracting path 320. The remainder of the hybrid deep learning network operates similarly to the original U-Net architecture as shown in FIG. 2 but on the concatenated input of the raw image 340 and hint image 350 vector input generated by the concatenation layer 360.

Figure 3C:
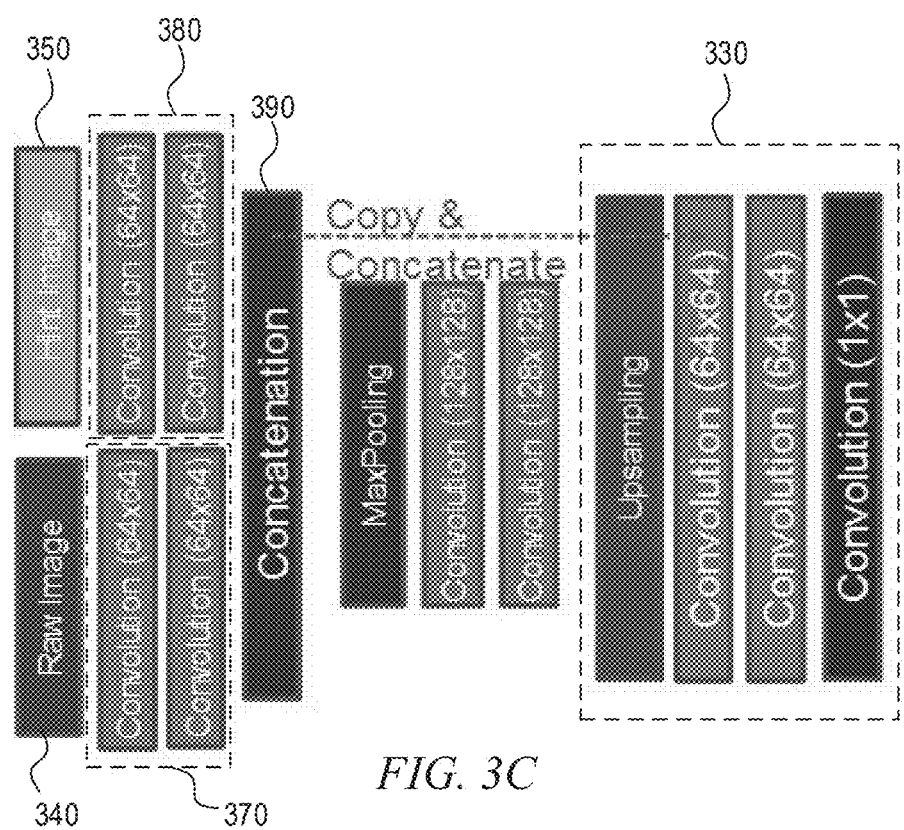
FIG. 3C is an example diagram illustrating one illustrative embodiment of a hybrid deep learning network in accordance with one illustrative embodiment, in which the hint image and raw image are processed through separate contracting paths of the U-Net architecture with subsequent concatenation of the results of the separate contracting paths prior to processing via the expansion path.

FIG. 3C is an example diagram illustrating one illustrative embodiment of a hybrid deep learning network in accordance with one illustrative embodiment, in which the hint image and raw image are processed through separate contracting paths of the U-Net architecture with subsequent concatenation of the results of the separate contracting paths prior to processing via the expansion path, i.e. an "inner fusion" embodiment. Again, the base architecture of the deep learning network is modeled after the U-Net architecture in this example illustrative embodiment. However, as shown in FIG. 3C, the raw image data 340 is input to its own set of convolutional layers 370 separate from the convolutional layers 380 used to process the hint image as part of the contracting path 320. It should be appreciated that while only two convolutional layers are shown in each of the convolutional layers 370, 380 additional convolutional layers, maxpooling layers, and the like, may be provided prior to the concatenation layer 390 as part of the contracting path 320 separately for each of the separate raw image 340 and hint image 350 processing paths.

The concatenation layer 390 concatenates the vector outputs from the separate processing paths of the raw image 340 and hint image 350 prior to processing by the U-Net architecture as part of the expansive path. The remainder of the hybrid deep learning network operates similarly to the original U-Net architecture as shown in FIG. 2 but on the concatenated output vector of processing paths of the raw image 340 and hint image 350.

With reference to FIG. 3B again, it should be appreciated that the concatenation of the hint image with the raw image data to generate a concatenated input creates a larger input vector. However, with regard to FIG. 3C, separately processing the raw input image and hint image requires two separate parallel paths of convolutional layers, adding to the need to train two separate "mini-deep learning networks," but with the results being combined in the deconvolution layer. Each embodiment may be more suitable to different implementations. In either case, however, once the deep learning networks are designed by feeding the relevant inputs and making the relevant connections, the network learns the network operational parameters by itself using the objective function as the guiding criterion. In both cases, the resulting model in has fewer parameters and is compactly storable. Moreover, the deep learning network trains in a much smaller time period than other deep learning networks, making possible live onsite learning.

When trained, the hybrid deep learning networks of the illustrative embodiments may be utilized to perform various tasks for which they are trained. In accordance with the primary embodiment described herein, one such task is anomaly detection and segmentation. For example, the hybrid deep learning networks may be part of a cognitive medical imaging system which operates to identify such anomalies and then annotate the medical image data, such as may be provided by other medical image data sources, provided in a corpus or corpora of medical image data, or the like. Such operations may be performed in response to requests from users to perform such analysis and annotation of medical image data. For example, a referring physician, may be engaged in reviewing the medical images taken for a patient. The medical imaging service provider may provide the raw medical image data, however, the doctor, while a medical professional, may not have the same level of training and expertise as a radiologist, sonographer, MRI expert, or the like, and thus, may not readily identify the anomalies mentioned in the medical report in the corresponding medical images. As a result, the doctor may request that the mechanisms of the illustrative embodiments perform anomaly detection and identification to assist the doctor in treating the patient.

In other illustrative embodiments, the mechanisms of the illustrative embodiments may be used to expand a set of annotated medical image data that may be used for training other cognitive systems or medical image analysis systems. That is, other cognitive systems and medical image analysis systems may utilize training medical image data having annotations that provide a ground truth or basis for the training. The mechanisms of the illustrative embodiments, by providing automated annotation of medical images using the trained hybrid deep learning networks effectively can be used to expand a relatively small manually annotated set of training medical images by including additional automatically annotated medical images. Thus, the automatically annotated medical images generated by the mechanisms of the illustrative embodiments may be added to a previously existing annotated medical image dataset to expand that annotated medical image dataset, which may then be used as input for training a cognitive system or other medical image analysis system.

A plethora of other tasks may be implemented using the trained hybrid deep learning network of the illustrative embodiments. Essentially any now known, or later discovered, application of a deep learning network for performing image analysis may be a task to which the mechanisms of the illustrative embodiments may be applied with improved performance of the hybrid deep learning network over known deep learning networks as discussed hereafter.

Figure 4:
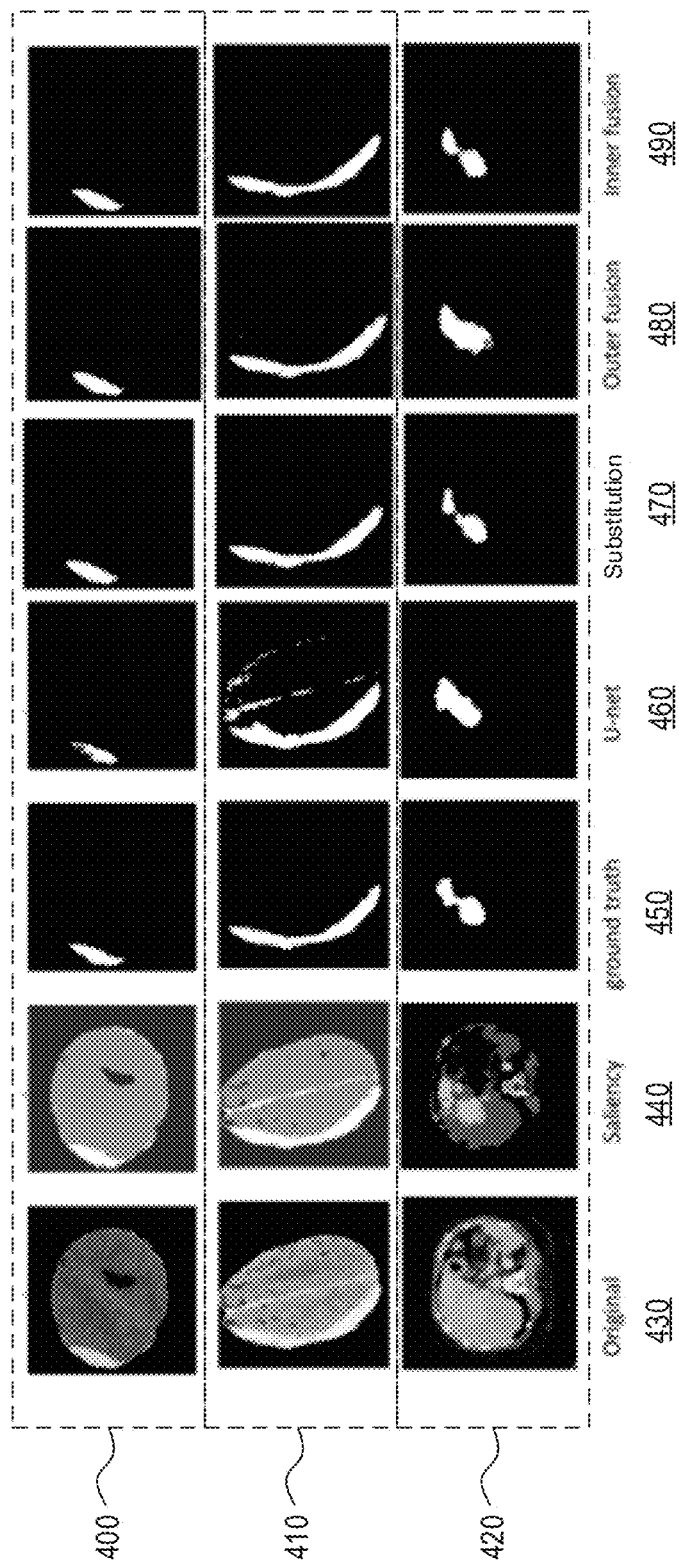
FIG. 4 illustrates a comparison of performance of the various deep learning networks represented in the diagrams of FIGS. 2 and 3A-3C.

FIG. 4 illustrates a comparison of performance of the various deep learning networks represented in the diagrams of FIGS. 2 and 3A-3C. The first row of images 400 represents a case of a medical image showing an epidural. The second row of images 410 represents a subdural hematoma. The third row of images 420 represents a liver hemangioma.

The first column 430 shows the corresponding original raw image of the corresponding abnormality. The second column 440 shows the corresponding region saliency image or "hint" image generated through the mechanisms of one or more illustrative embodiments herein which highlight regions of interest for training of the hybrid deep learning network. The third column 450 represents the ground truth segmentation result that should be generated by a properly trained deep learning network. The fourth column 460 represents the image segmentation output generated by a U-Net architecture such as shown in FIG. 2.

The fifth column 470 shows the image segmentation output generated by a hybrid deep learning network embodiment of the illustrative embodiments in which the hint image is substituted for the raw image data, i.e. the "substitution" embodiment, such as shown in FIG. 3A. The sixth column 480 shows the image segmentation output generated by a hybrid deep learning network embodiment of the illustrative embodiments in which the raw image and hint image are concatenated prior to processing by the contracting path of the deep learning network, i.e. the "outer fusion" embodiment, such as shown in FIG. 3B. The seventh column 490 shows the image segmentation output generated by a hybrid deep learning network embodiment of the illustrative embodiments in which the raw image and hint image are processed using separate contracting paths of convolutional layers with subsequent concatenation of results prior to processing by an expansive path, i.e. the "inner fusion" embodiment, such as shown in FIG. 3C.

As can be seen by a comparison of the columns 450-490, the hybrid deep learning networks 470-490 of the illustrative embodiments more closely approximate the ground truth in column 450 than the original U-Net architecture as shown in column 460. Of the hybrid deep learning networks 470-490, the inner fusion embodiment as shown in column 490 appears to more closely approximate the ground truth than the other hybrid deep learning networks 470-480, although each provide a better segmentation output than the original U-Net architecture.

The liver hemangioma example shown in the third row 420 demonstrates where one can see that, in the original raw image the anomaly did not stand out. However, once the hint image is provided, the anomalous region is salient and is able to assist the deep learning network in performing improved anomaly segmentation.

The improved performance of the hybrid deep learning network of the illustrative embodiments is confirmed by experimental results. That is, during experimentation using an anomaly segmentation task as the intended purpose of the hybrid deep learning network, the various embodiments described above were separately attempted on two datasets, a dataset of 978 brain CT slice images, and a dataset of 1000 liver CT slides depicting various sizes of liver hemangioma. Both datasets were obtained using data augmentation techniques, e.g., translate, rotate, skew, zoom, and rescale, applied to a raw set of 30 CT slides (17 epidural, 13 subdural hematomas) obtained from brain CT scans of 30 patients, and 31 liver CT slices from liver CT imaging of 31 patients. The dataset was initially split and then augmented to avoid a bias in the evaluation. In all cases, the training and testing images were from slices of different patients. Because the augmentation simulates realistic deformations, it allows the network to learn invariance to different positions of the anomaly inside the respective organs. Trained subject matter experts (SMEs) generated ground truth annotations manually using ITK-SNAP for the anomalies. For brain CT images, each image was skull stripped using thresholding and morphological opening.

The original U-Net architecture was given an input in the form of the raw images and an expected output of a ground truth image showing the location of the anomaly. To train the original U-Net architecture, 5 epochs were used with a batch size of 25 images, 100 batches per epoch and an image size of 128×128 pixels. 800 images were used for training, 100 for validation, and 78 for testing for brain CT slices, and a similar distribution for the liver CT slices.

For the hybrid deep learning networks of the illustrative embodiments, the experiment is repeated using the pair of raw images and their region saliency images, or "hint" images, with training and test datasets consisting of the pairs similarly divided. During testing, the hint images were generated for raw test images and combined using different fusion strategies within the network, e.g., outer fusion and inner fusion. The segmentation accuracy was assessed during the overlap between network-identified region and the ground truth labeled region using Jacquard index $|A \cap B|/|A \cup B|$ where A and B are the indicated region and the ground truth region, respectively.

Figures 5A, 5B:
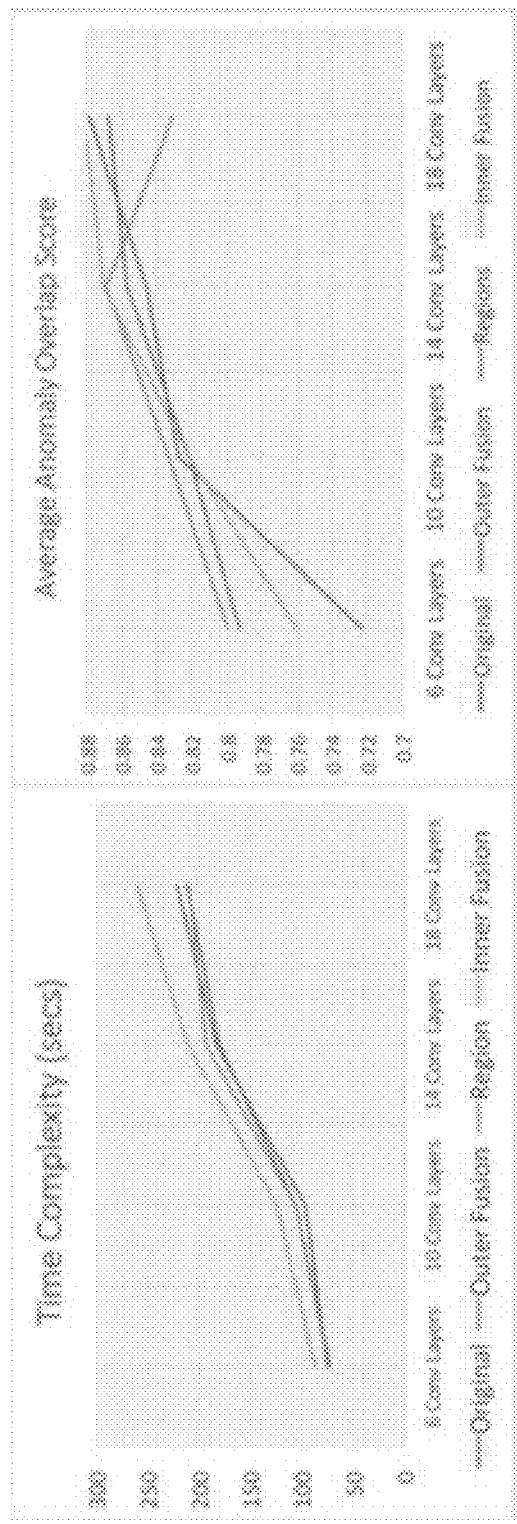
FIG. 5A is an example plot showing the relative time performance as a function of convolutional layers for the various deep learning networks represented in the diagrams of FIGS. 2 and 3A-3C.
FIG. 5B is an example plot of the resulting overlap scores for the various deep learning networks represented in the diagrams of FIGS. 2 and 3A-3C.

The resulting quality of the detected anomaly regions using the original U-Net architecture compared to the hybrid deep learning network embodiments is as shown in FIG. 4 above. In addition, the time performance and average overlap score over the test collection as a function of layers was assessed and the results are shown in the plots of FIGS. 5A and 5B. The relative time performance can be seen as a function of convolutional layers in FIG. 5A while the resulting overlap scores are shown for the different configurations in FIG. 5B. It can be seen from FIG. 5A, the time performance of all networks is roughly similar and grows with the number of layers. The drop in performance for the "substitution" embodiment network configuration from 18 layers to 34 layers indicates saturation. It can be seen from FIG. 5B that all network configurations fed with the combined input of the raw image data and the hint image data outperform the raw image input only network configuration when the number of layers are small, and the inner fusion network configuration approach performs the best overall as a function of layers. The improvement in segmentation accuracy was also confirmed using the overlap score for comparison as shown in Table 1 below for the liver CT slice dataset:

TABLE 1

| Segmentation Accuracy on Liver CT Dataset | | | |
|---|---|---|---|
| Orig. U-Net | Substitution | Outer Fusion | Inner Fusion |
| 0.582 | 0.673 | 0.523 | 0.623 |

Thus, by pre-seeding a deep learning network with region saliency images or "hint" images that highlight anomalous regions, along with raw images being provided as input, leads to overall improvement in accuracy of anomaly detection showing the benefits of using engineered features in combination with self-learned features of the deep learning networks.

The various embodiments of a hybrid deep learning network may be implemented in one or more specifically configured computing devices through the special configuration of the hardware and/or software of the computing device. In the case of software, the illustrative embodiments may be implemented through a configuration of the computing device to load the software into one or more memories and then execute, by one or more processors of the computing devices, the software instructions to specifically configured the computing device(s) to implement the hybrid deep learning network. It should be appreciated that once configured in this manner, the computing devices are specially configured to be hybrid deep learning network computing devices implementing the logical structures and processes necessary to function in the manner described herein with regard to one or more of the illustrative embodiments.

Figure 6:
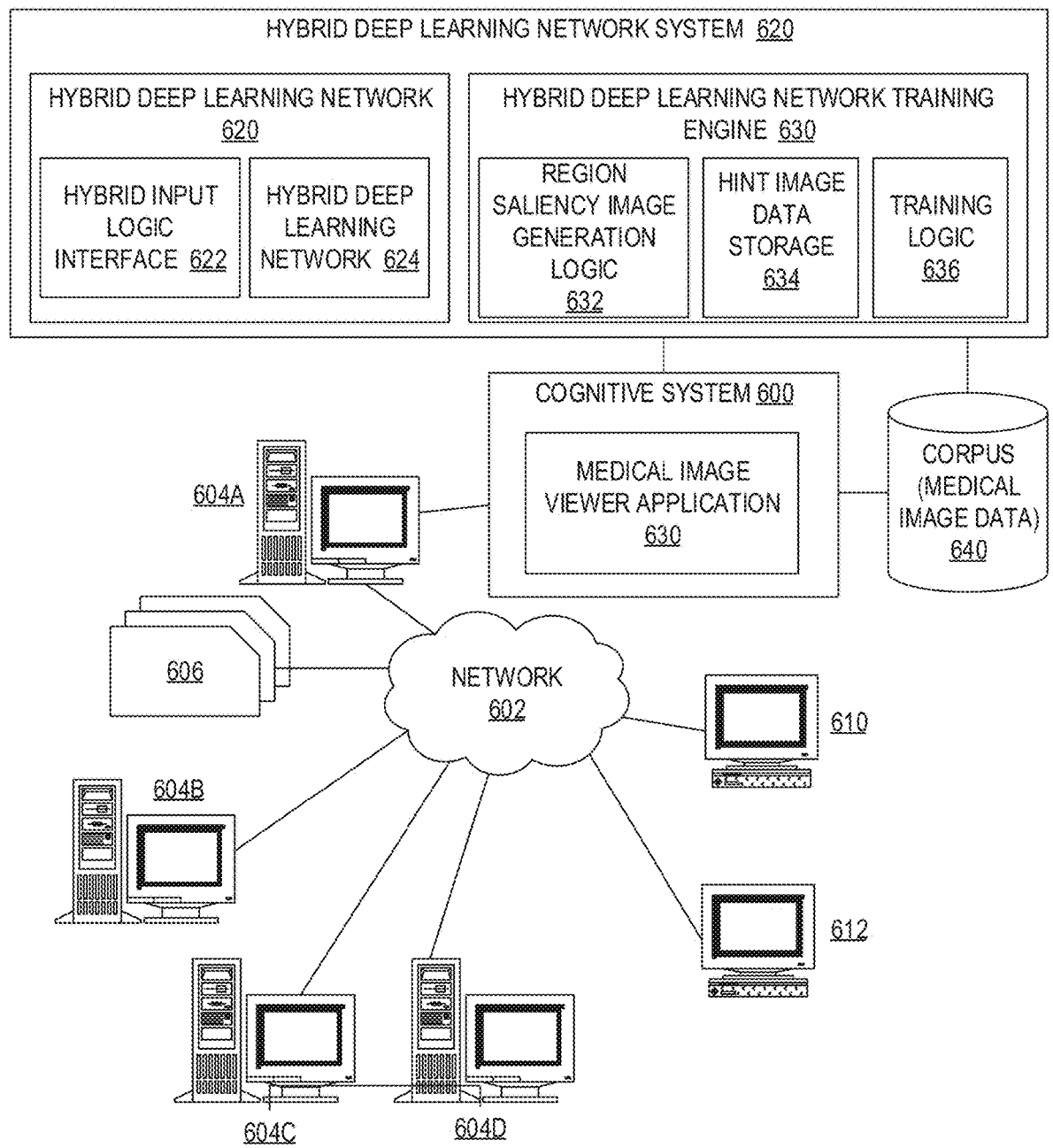
FIG. 6 depicts a schematic diagram of one illustrative embodiment of a cognitive system implementing a hybrid deep learning network.

FIG. 6 depicts a schematic diagram of one illustrative embodiment of a cognitive system 600 implementing a medical image viewer application 650 in a computer network 602. The cognitive system 600 implements a hybrid deep learning network in accordance with at least one of the illustrative embodiments described herein, as well as hint image generation logic and corresponding data structures and storage mechanisms for facilitating the training of the hybrid deep learning network.

The cognitive system 600 is implemented on one or more computing devices 604A-D (comprising one or more processors and one or more memories, and potentially any other computing device elements generally known in the art including buses, storage devices, communication interfaces, and the like) connected to the computer network 602. For purposes of illustration only, FIG. 6 depicts the cognitive system 600 being implemented on computing device 604A only, but as noted above the cognitive system 600 may be distributed across multiple computing devices, such as a plurality of computing devices 604A-D. The network 602 includes multiple computing devices 604A-D, which may operate as server computing devices, and 610-612 which may operate as client computing devices, in communication with each other and with other devices or components via one or more wired and/or wireless data communication links, where each communication link comprises one or more of wires, routers, switches, transmitters, receivers, or the like.

In some illustrative embodiments, the cognitive system 600 and network 602 enables question processing and answer generation (QA) functionality for one or more cognitive system users via their respective computing devices 610-612. In other embodiments, the cognitive system 600 and network 602 may provide other types of cognitive operations including, but not limited to, request processing and cognitive response generation which may take many different forms depending upon the desired implementation, e.g., cognitive information retrieval, training/instruction of users, cognitive evaluation of data, such as medical imaging data, or the like. Other embodiments of the cognitive system 600 may be used with components, systems, sub-systems, and/or devices other than those that are depicted herein.

In some illustrative embodiments, the client computing devices 610 and 612 may be used as a mechanism for logging onto or otherwise accessing the cognitive system 600 for purposes of viewing medical imaging studies for patients and perform operations for classifying and/or corroborating automated classification of such medical imaging studies. For example, a doctor or other medical professional may utilize a client computing device 610 to access the services and functionality provided by the cognitive system 600 and the medical image viewer application 650 to view medical images of one or more medical imaging studies stored in the corpus 640 for one or more patients. The user of the client computing device 610 may view the medical images and perform operations for annotating the medical images, adding notes to patient electronic medical records (EMRs), and any of a plethora of other operations that may be performed through human-computer interaction based on the human's viewing of the medical images via the cognitive system 600. In accordance with the illustrative embodiments, the user may make use of the medical image viewer application 650 to view medical images that have been processed via the hybrid deep learning network of one or more of the illustrative embodiments, which operates to highlight regions of the medical image according to the particular task for which it was trained, e.g., anomaly detection or the like.

In some illustrative embodiments, the cognitive system 600 may be configured to implement a request processing pipeline that receive inputs from various sources. The requests may be posed in the form of a natural language question, natural language request for information, natural language request for the performance of a cognitive operation, or the like. For example, the cognitive system 600 may receive input from the network 602, a corpus or corpora of electronic documents 606, cognitive system users, and/or other data and other possible sources of input. In one embodiment, some or all of the inputs to the cognitive system 600 are routed through the network 602. The various computing devices 604A-D on the network 602 include access points for content creators and cognitive system users. Some of the computing devices 604A-D include devices for a database storing the corpus or corpora of data 606 (which is shown as a separate entity in FIG. 6 for illustrative purposes only). Portions of the corpus or corpora of data 606 may also be provided on one or more other network attached storage devices, in one or more databases, or other computing devices not explicitly shown in FIG. 6. The network 602 includes local network connections and remote connections in various embodiments, such that the cognitive system 600 may operate in environments of any size, including local and global, e.g., the Internet.

The request processing pipeline of the cognitive system 600 may comprises a plurality of stages for processing an input question/request based on information obtained from the corpus or corpora of data 606 and/or 640. For example, a doctor may input a question of the type "Where is the anomaly in Patient A's chest X-ray?" or may input a request of the type "Identify the anomaly in Patient A's chest X-ray." Alternatively, the question/request may be the selection, via a user interface of the like, of a particular operation to be performed by the cognitive system on a particular viewed medical image, such as may be viewed via the medical image viewer application 650. For example, the doctor may access a medical image associated with a patient and select an option to identify any anomalous regions in the medical image.

The pipeline generates answers/responses for the input question or request based on the processing of the input question/request and the corpus or corpora of data 606, 640. For example, the request to render the medical image, or to identify an anomalous region in the medical image, may invoke the operation of the trained hybrid deep learning network 320 of the illustrative embodiments which is trained using the hybrid approach comprising training on both raw image data and region saliency or "hint" image data. Alternatively, the operation of the hybrid deep learning network 320 of the illustrative embodiments may be performed in response to new medical imaging data being received, e.g., added to the corpus 640 and/or 606, by one or more medical imaging data source computing systems, such as computing systems associated with medical image capturing equipment of various types, e.g., CT imaging equipment/systems, PET imaging equipment/systems, x-ray imaging equipment/systems, sonogram imaging equipment/systems, echocardiogram equipment/systems, and the like.

In some illustrative embodiments, the cognitive system 600 may be the IBM Watson cognitive system available from International Business Machines Corporation of Armonk, N.Y., which is augmented with the mechanisms of the illustrative embodiments described herein. More information about the pipeline of the IBM Watson cognitive system may be obtained, for example, from the IBM Corporation website, IBM Redbooks, as well as in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 6, the cognitive system 600 may operate in conjunction with a hybrid deep learning network system 620 and hybrid deep learning network training engine 630, in accordance with the mechanisms of the illustrative embodiments. As shown in FIG. 6, the hybrid deep learning network system 620 comprises hybrid input logic interface 622 and hybrid deep learning network 624. The hybrid input logic interface 622 operates, during a training phase of operation of the hybrid deep learning network 624, to received both raw (non-annotated) image data from an image data source computing system coupled to the network 602, a corpus 606, 640, or the like, and region saliency image data or "hint" image data from a corresponding region saliency image data or hint image data storage 634. The region saliency image data or "hint" image data may be generated from raw image data by the hybrid deep learning network training engine 630 using a process such as previously described above.

That is, the hybrid deep learning network training engine 630 comprises region saliency image (hint image) generation logic 632 which operates on a raw image data input to generate a corresponding region saliency image or hint image. In generating the region saliency image or hint image, the region saliency image generation logic 632 performs a segmentation process on the raw image data using multi-level thresholding, color connected component grouping to identify regions in the raw image data, and a task specific saliency operator based filtering. The task specific saliency operator is selected so as to be generalizable to different tasks, such as a size filter on regions of different tissue densities, for example. In some illustrative embodiments, an intensity histogram of the input raw image data may be generated and segmented into levels of intensity optimally chosen based on the distribution of intensities, with optimal thresholds being chosen by maximizing the inter-class variance as described previously with regard to Eq. 1. The resulting region salient images generated by the region saliency image generation logic 632 may be stored in the region saliency image data or hint image data storage 634 for use in training the hybrid deep learning network 624. Training logic 636 provides the overall logic for enforcing training of the hybrid deep learning network 624 through the optimization of an objective function, e.g., minimization of a loss function, associated with the hybrid deep learning network based on a ground truth data storage 628.

The ground truth data storage 628 stores ground truth image data against which the output of the hybrid deep learning network 624 may be compared to determine an overlap of the regions identified in the raw image data by the hybrid deep learning network 624 and the regions specified in the corresponding ground truth images. That is, during training the training images that are input as raw image data may be training images for which there is a corresponding ground truth image indicating the regions that should be identified by the hybrid deep learning network 624 when it is properly trained. The hint image provides an indication of salient regions to which the hybrid deep learning network 624 should focus when processing the raw image data. By focusing the hybrid deep learning network 624 on the regions in the hint image when performing processing of the raw image data, the training occurs more quickly as the hybrid deep learning network 624 achieves convergence more quickly due to the reduction in areas of the image that are processed to those that the hint image indicates are areas or regions of interest. The training logic 636 determines modifications of the operational parameters of the convolutional layers of the hybrid deep learning network 624 so as to optimize the objective function of the hybrid deep learning network 624 and achieve convergence. The training may involve multiple epochs as described previously.

During training, the hybrid input logic interface 622 provides both the raw image data and the corresponding hint image data to the hybrid deep learning network 624 which operates on one or more both inputs according to the particular illustrative embodiment implemented by the hybrid deep learning network 624. In some illustrative embodiments the hybrid deep learning network 624 may implement a "substitution" embodiment in which only the hint image is input to the hybrid deep learning network 624 as a substitution for the corresponding raw image data and training is performed based on the hint images corresponding to the raw training image data. In some illustrative embodiments, the hybrid deep learning network 624 may implement an outer-fusion embodiment in which a concatenation layer is provided in the hybrid deep learning network 624 to concatenate the raw image data and the hint image data together prior to the concatenated result being processed by the convolutional layers of the hybrid deep learning network 624. In still another illustrative embodiment, the hybrid deep learning network 624 may implement an inner-fusion embodiment in which separate convolutional layers on a contraction path of the hybrid deep learning network 624 are provided for each of the hint image data and the raw image data, with the results of these separate paths being concatenated by a concatenation layer prior to further processing through an expansive path of the hybrid deep learning network 624.

The hybrid deep learning network training engine 630 trains the hybrid deep learning network 624 through a machine learning process to cause the hybrid deep learning network 624 to properly process raw image data and generate a correct output according to the particular task for which the hybrid deep learning network 624 is being trained, e.g., anomaly detection in a particular area of the human body. Once trained, the hybrid deep learning network 624 may then be utilized to process new raw image data and generate corresponding results which may be output by the cognitive system 600 in response to requests from users. This output may be annotated versions of the raw image data, such as with salient regions highlighted or otherwise annotated, for example.

Thus, for example, having trained the hybrid deep learning network 624, the medical professional may submit a request to the cognitive system 600, such as via a graphical user interface (GUI) of the medical image viewer application 650, or the like, to view a medical image and have the cognitive system 600 identify anomalous regions within the medical image. Responsive to the request, the cognitive system 600, in processing the request via the request processing pipeline, may invoke the hybrid deep learning network, which has already been trained as discussed above, to automatically annotate contours within the medical image defining anomalous regions. The hybrid deep learning network 624 may process the medical image data retrieved from the corpus 640, in the manner previously described above with regard to one or more of the illustrative embodiments and corresponding network architectures, to thereby automatically identify contour points defining an anomalous region in the medical image data. The contour points may then be used to graphically render a bounding polygon or other contour indicating the anomalous region on a rendering of the medical image via the medical image viewer application 650. Moreover, the medical image data may be modified and updated to include metadata specifying the automatically identified and annotated contour in the medical image.

As mentioned above, in an alternative embodiment, the operations of the trained hybrid deep learning network 624 may be automatically invoked when new medical image data are added to the corpus 640. For example, as a preprocessing operation when the data is added to the corpus 640, the trained hybrid deep learning network 624 may operate on the data to identify the coordinates of the anomalous regions in the medical images and annotate them, thereby updating the medical image data to include metadata specifying the anomalous region(s). Thereafter, during runtime when the medical professional requests identification of anomalous regions in the medical image, the annotated medical image may be retrieved from the corpus 640 without having to then invoke the operations of the trained hybrid deep learning network 624.

Thus, the illustrative embodiments provide mechanisms for improving the training of a deep learning network by providing mechanisms for generating region saliency images or hint images and modifying the architecture of the deep learning network to process either the hint images themselves as substitutions for the raw images or processing a combination of raw image data and the hint images. The implementation of such hybrid deep learning networks provides improved performance including quicker training times requiring less complexity in the network architecture than known mechanisms.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 4 is provided as an example of one type of data processing system in which aspects of the present invention may be implemented. Many other types of data processing systems may be likewise configured to specifically implement the mechanisms of the illustrative embodiments.

Figure 7:
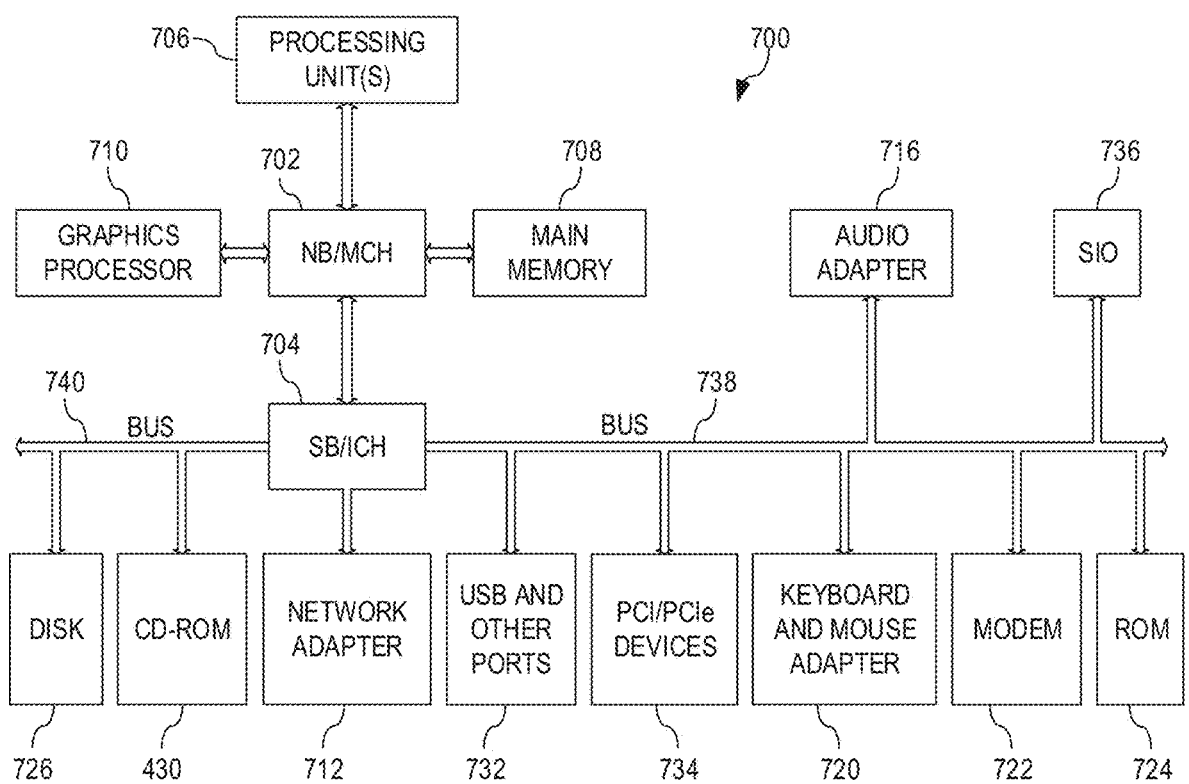
FIG. 7 is a block diagram of an example data processing system in which aspects of the illustrative embodiments are implemented.

FIG. 7 is a block diagram of an example data processing system in which aspects of the illustrative embodiments are implemented. Data processing system 700 is an example of a computer, such as a server 604A-D or client 610-612 in FIG. 6, in which computer usable code or instructions implementing the processes for illustrative embodiments of the present invention are located. In one illustrative embodiment, FIG. 7 represents a server computing device, such as a server 604A, which, which implements a cognitive system 600 and medical image viewer application 650, where the server 604A further is specifically configured and executes hardware and/or software logic to implement the hybrid deep learning network mechanisms of FIG. 6.

In the depicted example, data processing system 700 employs a hub architecture including North Bridge and Memory Controller Hub (NB/MCH) 702 and South Bridge and Input/Output (I/O) Controller Hub (SB/ICH) 704. Processing unit 706, main memory 708, and graphics processor 710 are connected to NB/MCH 702. Graphics processor 710 is connected to NB/MCH 702 through an accelerated graphics port (AGP).

In the depicted example, local area network (LAN) adapter 712 connects to SB/ICH 704. Audio adapter 716, keyboard and mouse adapter 720, modem 722, read only memory (ROM) 724, hard disk drive (HDD) 726, CD-ROM drive 730, universal serial bus (USB) ports and other communication ports 732, and PCI/PCIe devices 734 connect to SB/ICH 704 through bus 738 and bus 740. PCI/PCIe devices may include, for example, Ethernet adapters, add-in cards, and PC cards for notebook computers. PCI uses a card bus controller, while PCIe does not. ROM 724 may be, for example, a flash basic input/output system (BIOS).

HDD 726 and CD-ROM drive 730 connect to SB/ICH 704 through bus 740. HDD 726 and CD-ROM drive 730 may use, for example, an integrated drive electronics (IDE) or serial advanced technology attachment (SATA) interface. Super I/O (SIO) device 736 is connected to SB/ICH 704.

An operating system runs on processing unit 706. The operating system coordinates and provides control of various components within the data processing system 700 in FIG. 7. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 700.

As a server, data processing system 700 may be, for example, an IBM® eServer™ System p® computer system, running the Advanced Interactive Executive) (AIX®) operating system or the LINUX® operating system. Data processing system 700 may be a symmetric multiprocessor (SMP) system including a plurality of processors in processing unit 706. Alternatively, a single processor system may be employed.

Instructions for the operating system, the object-oriented programming system, and applications or programs are located on storage devices, such as HDD 726, and are loaded into main memory 708 for execution by processing unit 706. The processes for illustrative embodiments of the present invention are performed by processing unit 706 using computer usable program code, which is located in a memory such as, for example, main memory 708, ROM 724, or in one or more peripheral devices 726 and 730, for example.

A bus system, such as bus 738 or bus 740 as shown in FIG. 7, is comprised of one or more buses. Of course, the bus system may be implemented using any type of communication fabric or architecture that provides for a transfer of data between different components or devices attached to the fabric or architecture. A communication unit, such as modem 722 or network adapter 712 of FIG. 7, includes one or more devices used to transmit and receive data. A memory may be, for example, main memory 708, ROM 724, or a cache such as found in NB/MCH 702 in FIG. 7.

Those of ordinary skill in the art will appreciate that the hardware depicted in FIGS. 6 and 7 may vary depending on the implementation. Other internal hardware or peripheral devices, such as flash memory, equivalent non-volatile memory, or optical disk drives and the like, may be used in addition to or in place of the hardware depicted in FIGS. 6 and 7. Also, the processes of the illustrative embodiments may be applied to a multiprocessor data processing system, other than the SMP system mentioned previously, without departing from the spirit and scope of the present invention.

Moreover, the data processing system 700 may take the form of any of a number of different data processing systems including client computing devices, server computing devices, a tablet computer, laptop computer, telephone or other communication device, a personal digital assistant (PDA), or the like. In some illustrative examples, data processing system 700 may be a portable computing device that is configured with flash memory to provide non-volatile memory for storing operating system files and/or user-generated data, for example. Essentially, data processing system 700 may be any known or later developed data processing system without architectural limitation.

Figure 8:
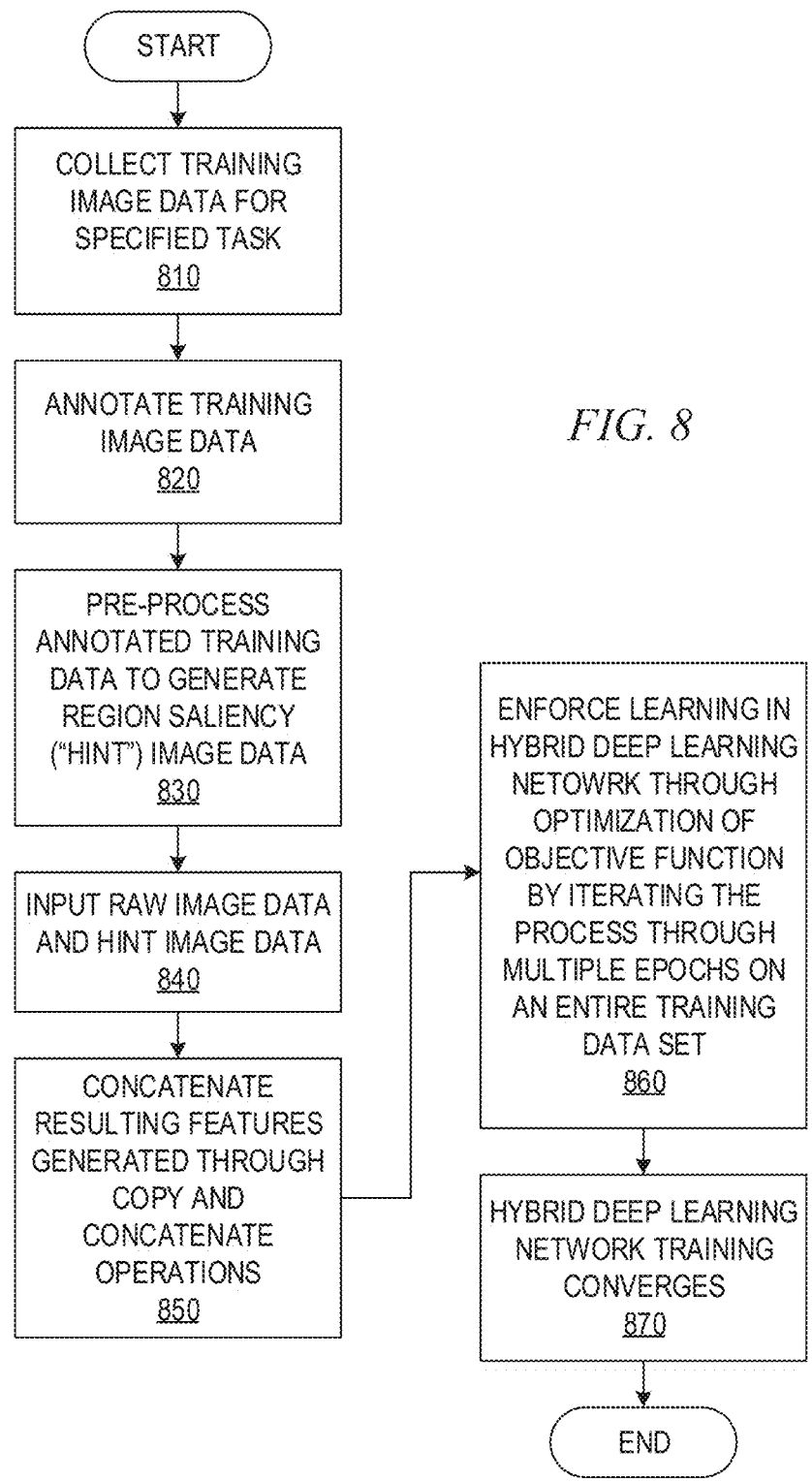
FIG. 8 is a flowchart outlining an example operation for training a hybrid deep learning network in accordance with one illustrative embodiment.

FIG. 8 is a flowchart outlining an example operation for training a hybrid deep learning network in accordance with one illustrative embodiment. As shown in FIG. 8, the operation starts by collecting training image data for a specified task, e.g., anomaly detection task (step 810). The training image data is annotated by a subject matter expert, e.g., any anomalies in the training image data may be annotated, so as to generate a ground truth version of the training image (step 820). The annotated training image data is pre-processed using a task specific saliency operator to generate a corresponding region saliency image or "hint" image (step 830). This pre-processing may comprise performing a multi-level thresholding of the training image data, color connected component grouping to identify regions, and filtering of regions based on saliency measures, for example. The raw image data along with the region saliency image, or "hint" image, are input to the hybrid deep learning network in accordance with the particular embodiment of the hybrid deep learning network, e.g., substitution, outer-fusion, or inner-fusion embodiment (step 840). The resulting features generated are concatenated through copy and concatenate operations within the hybrid deep learning network (step 850). The learning by the hybrid deep learning network is enforced through the optimizing of the objective function by iterating the process through multiple epochs on an entire training data set (step 860) until the hybrid deep learning network is trained (step 870). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, wherein the at least one memory comprises instructions that are executed by the at least one processor to cause the at least one processor to implement a hybrid deep learning network, and wherein the method comprises:

receiving, by the hybrid deep learning network, from an imaging system, first input data specifying a non-annotated image;

pre-processing, by the hybrid deep learning network, the non-annotated image to generate second input data specifying a hint image and corresponding annotation data specifying salient regions of the hint image;

processing, by the hybrid deep learning network, the first input data and second input data to perform training of the hybrid deep learning network by targeting feature detection in the non-annotated image in the salient regions identified in the hint image; and processing, using the trained hybrid deep learning network, third input data specifying a new non-annotated image to thereby identify an object or structure in the new non-annotated image, wherein processing the first input data and second input data to perform training of the hybrid deep learning network comprises at least one of:

performing an outer fusion operation to combine the first input data with the second input data to generate a combined image input, prior to inputting the combined image input into the deep learning network, wherein the deep learning network utilizes a single set of one or more convolutional filter layers to process the combined image input;

performing an inner fusion operation to submit the first input data to a first set of one or more convolutional filter layers of the deep learning network, and to submit the second input data to a second set of one or more convolutional filter layers of the deep learning network, and wherein outputs of the first set of one or more convolutional filter layers and the second set of one or more convolutional filter layers are merged to form a combined feature input to a de-convolution portion of the deep learning network; or performing a substitution operation to substitute the second input data for the first input data as input to the deep learning network to perform training of the hybrid deep learning network.

2. The method of claim 1, wherein processing the first input data and second input data to perform training of the hybrid deep learning network by targeting feature detection in the non-annotated image in the salient regions identified in the hint image comprises filtering out regions of the non-annotated image that are not specified in the hint image as being salient regions.

3. The method of claim 1, wherein the pre-processing of the non-annotated image comprises generating the hint image at least by performing, on the non-annotated image, a multi-level thresholding operation with region grouping based on one or more saliency operators.

4. The method of claim 3, wherein the plurality of saliency operations comprise at least one image characteristic, and wherein the at least one image characteristic comprises at least one of a region size, a region location, color value, or an intensity value.

5. The method of claim 1, wherein the pre-processing of the non-annotated image comprises applying a region size filter on regions of the non-annotated image having different tissue densities to thereby identify salient regions within the non-annotated image.

6. The method of claim 5, wherein the pre-processing of the non-annotated image further comprises performing a color connected component grouping that identifies salient regions within the non-annotated image, where anatomical structures in the non-annotated image that have similar characteristics have similar coloring in the non-annotated image.

7. The method of claim 6, further comprising:
performing task specific filtering of salient regions in the pre-processed non-annotated image to identify salient regions of interest to the particular task being performed; and
generating the hint image based on the filtered salient regions, wherein the task specific filtering comprises applying task specific saliency measures indicating either positive or negative saliency for the particular task.

8. The method of claim 1, wherein the annotation data specifies one or more contours in the non-annotated image, and one or more corresponding labels, identifying anatomical structures present in the non-annotated image.

9. The method of claim 1, wherein the imaging system is at least one of a x-ray imaging system, a sonogram imaging system, a computed tomography (CT) scan imaging system, a positron emission tomography (PET) scan imaging system, magnetic resonance image (MRI) imaging system, or an echocardiography imaging system.

10. A computer program product comprising a computer readable storage medium having a computer readable program stored therein, wherein the computer readable program, when executed on a data processing system, causes the data processing system to implement a hybrid deep learning network that operates to:
receive, from an imaging system, first input data specifying a non-annotated image;
pre-process the non-annotated image to generate second input data specifying a hint image and corresponding annotation data specifying salient regions of the hint image; and
process the first input data and second input data to perform training of the hybrid deep learning network by targeting feature detection in the non-annotated image in the salient regions identified in the hint image, and wherein the data processing system further processes, using the trained hybrid deep learning network, third input data specifying a new non-annotated image to thereby identify an object or structure in the new non-annotated image, wherein the computer readable program further causes the hybrid deep learning network to process the first input data and second input data to perform training of the hybrid deep learning network at least by one of:
performing an outer fusion operation to combine the first input data with the second input data to generate a combined image input, prior to inputting the combined image input into the deep learning network, wherein the deep learning network utilizes a single set of one or more convolutional filter layers to process the combined image input;
performing an inner fusion operation to submit the first input data to a first set of one or more convolutional filter layers of the deep learning network, and to submit the second input data to a second set of one or more convolutional filter layers of the deep learning network, and wherein outputs of the first set of one or more convolutional filter layers and the second set of one or more convolutional filter layers are merged to form a combined feature input to a de-convolution portion of the deep learning network; or
performing a substitution operation to substitute the second input data for the first input data as input to the deep learning network to perform training of the hybrid deep learning network.

11. The computer program product of claim 10, wherein the computer readable program further causes the hybrid deep learning network to process the first input data and second input data to perform training of the hybrid deep learning network by targeting feature detection in the non-annotated image in the salient regions identified in the hint image at least by filtering out regions of the non-annotated image that are not specified in the hint image as being salient regions.

12. The computer program product of claim 10, wherein the computer readable program further causes the hybrid deep learning network to pre-process the non-annotated image at least by generating the hint image at least by performing, on the non-annotated image, a multi-level thresholding operation with region grouping based on one or more saliency operators.

13. The computer program product of claim 12, wherein the plurality of saliency operations comprise at least one image characteristic, and wherein the at least one image characteristic comprises at least one of a region size, a region location, color value, or an intensity value.

14. The computer program product of claim 10, wherein the computer readable program further causes the hybrid deep learning network to pre-process the non-annotated image at least by applying a region size filter on regions of the non-annotated image having different tissue densities to thereby identify salient regions within the non-annotated image.

15. The computer program product of claim 14, wherein the computer readable program further causes the hybrid deep learning network to pre-process the non-annotated image further at least by performing a color connected component grouping that identifies salient regions within the non-annotated image, where anatomical structures in the non-annotated image that have similar characteristics have similar coloring in the non-annotated image.

16. The computer program product of claim 15, wherein the computer readable program further causes the hybrid deep learning network to:
    perform task specific filtering of salient regions in the pre-processed non-annotated image to identify salient regions of interest to the particular task being performed; and
    generate the hint image based on the filtered salient regions, wherein the task specific filtering comprises applying task specific saliency measures indicating either positive or negative saliency for the particular task.

17. The computer program product of claim 10, wherein the annotation data specifies one or more contours in the non-annotated image, and one or more corresponding labels, identifying anatomical structures present in the non-annotated image.

18. A data processing system comprising:
    at least one processor; and
    at least one memory coupled to the at least one processor, wherein the at least one memory comprises instructions which, when executed by the at least one processor, cause the at least one processor to implement a hybrid deep learning network that operates to:
    receive, from an imaging system, first input data specifying a non-annotated image;
    pre-process the non-annotated image to generate second input data specifying a hint image and corresponding annotation data specifying salient regions of the hint image; and
    process the first input data and second input data to perform training of the hybrid deep learning network by targeting feature detection in the non-annotated image in the salient regions identified in the hint image, and wherein the data processing system further processes, using the trained hybrid deep learning network, third input data specifying a new non-annotated image to thereby identify an object or structure in the new non-annotated image, wherein the instructions further cause the hybrid deep learning network to process the first input data and second input data to perform training of the hybrid deep learning network at least by one of:
    performing an outer fusion operation to combine the first input data with the second input data to generate a combined image input, prior to inputting the combined image input into the deep learning network, wherein the deep learning network utilizes a single set of one or more convolutional filter layers to process the combined image input;
    performing an inner fusion operation to submit the first input data to a first set of one or more convolutional filter layers of the deep learning network, and to submit the second input data to a second set of one or more convolutional filter layers of the deep learning network, and wherein outputs of the first set of one or more convolutional filter layers and the second set of one or more convolutional filter layers are merged to form a combined feature input to a de-convolution portion of the deep learning network; or
    performing a substitution operation to substitute the second input data for the first input data as input to the deep learning network to perform training of the hybrid deep learning network.

* * * * *

UNITED STATES PATENT AND TRADEMARK OFFICE
CERTIFICATE OF CORRECTION

Page 1 of 1

PATENT NO. : 10,929,708 B2
APPLICATION NO. : 16/214922
DATED : February 23, 2021
INVENTOR(S) : Tanveer F. Syeda-Mahmood and Alexandros Karargyris It is certified that error appears in the above-identified patent and that said Letters Patent is hereby corrected as shown below:

On the Title Page

Item (72) Inventor's first name is listed incorrectly as "Alexandras" Karargyris, should read --Alexandros-- Karargyris Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*